(12) United States Patent
Worley et al.

(10) Patent No.: US 7,881,464 B1
(45) Date of Patent: Feb. 1, 2011

(54) MICROPHONE WITH REDUCED NOISE

(75) Inventors: Billy J. Worley, Hixson, TN (US);
Robert L. Doss, Ringgold, GA (US);
David G. Lashley, Cartersville, GA (US)

(73) Assignee: Plantronics, Inc., Santa Cruz, CA (US)

( * ) Notice: Subject to any disclaimer, the term of this patent is extended or adjusted under 35 U.S.C. 154(b) by 867 days.

(21) Appl. No.: 11/879,552

(22) Filed: Jul. 17, 2007

Related U.S. Application Data

(62) Division of application No. 10/746,509, filed on Dec. 23, 2003, now Pat. No. 7,298,859.

(51) Int. Cl.
*H04M 1/00* (2006.01)
*H04R 9/08* (2006.01)

(52) U.S. Cl. .................................. 379/433.01; 381/355

(58) Field of Classification Search .................. 381/355, 381/361, 369, 191; 379/433.01, 433.03, 379/328.01; 181/158, 242
See application file for complete search history.

(56) References Cited

U.S. PATENT DOCUMENTS 3,715,525 A * 2/1973 Fielding ...................... 379/450
4,463,222 A * 7/1984 Poradowski ................ 381/357

* cited by examiner

*Primary Examiner*—Tuan D Nguyen
(74) *Attorney, Agent, or Firm*—Intellectual Property Law Office of Thomas Chuang

(57) ABSTRACT

The present invention provides a microphone apparatus. The microphone apparatus includes a housing with an outer surface and an interior chamber. A microphone element is disposed within the interior chamber. The outer surface includes a first substantially planar surface having at least one aperture leading to the interior chamber and a second substantially planar surface intersecting at an angle with the first planar surface.

15 Claims, 5 Drawing Sheets

MICROPHONE WITH REDUCED NOISE

RELATED APPLICATIONS

This application is a divisional application of application Ser. No. 10/746,509, filed Dec. 23, 2003 now U.S. Pat. No. 7,298,859, entitled "Microphone with Reduced Noise".

TECHNICAL FIELD

The present invention relates to the general field of microphones and telephonic devices. More specifically the invention relates to microphones with reduced noise.

BACKGROUND

Telephonic device designs, and their accompanying microphone assemblies designs, generally address background noise and reverberations that interfere with the sound quality a speech signal received by the handset user. Such background noise and reverberations diminish speech intelligibility perceived by the far-end party on the telephone call. In the prior art, acoustical noise-canceling (also referred to as "close-talking") microphones are typically used to address this noise. Such microphones are used in handsets and boom headsets, for example.

Microphones are also susceptible to "puff" or "plosive" noise, resulting from plosive sounds in the talker's speech itself. Plosive sounds result from speaking words which require a substantial amount of air in order to articulate the sound. Examples of plosive sounds are the constants "p", "t", and "d". Such plosive sounds result in "puff" or "plosive" noise when the air hits the microphone assembly, causing detectable turbulence. For example, the spoken words, "Peter Piper Picked a Peck of Pickled Peppers" contain the plosive "p" sounds.

In the prior art, telecommunications handsets and hands-free devices such as boom headsets have advantageously placed the microphone ports in the mouthpiece close to a talker's lips. The distance between the microphone ports and the talker's lips is often referred to as the "modal distance", and is typically between 12 and 60 mm.

Minimizing the modal distance provides for increased pickup of the talker's speech signal, which decreases as the modal distance increases. Thus, it is generally desirable to minimize the modal distance regardless of the telecommunications application (e.g., handset or hands-free device) utilizing the microphone. In this manner, the acoustical signal-to-noise ratio, and thus sound quality, is maximized for each application.

However, background noise and reverberation pickup by the microphone are not affected by modal distance. In noisy locations, such as encountered in commercial work spaces like a stock exchange floor or in a trade show, acoustical noise-canceling microphones are utilized to reduce the effects of background noise. Noise canceling microphones are more sensitive to the near-field spherical acoustical signals radiating from the lips than the far-field noise plane waves approaching the microphone's ports. Furthermore, noise canceling microphones discriminate against incoming random-incident background noise in favor of the talker's speech by pointing its pickup sensitivity spatial lobe preferentially toward the talker's lips.

Noise-canceling microphone assemblies use multiple acoustic inputs, typically two ports on the housing surface sampling the sound, with each port leading to one side of a gradient electret microphone element diaphragm. Improved noise cancellation performance is achieved with decreased modal distance. Gradient microphone elements, while performing the desired noise-canceling function on background noise versus the talker's speech, unfortunately have an elevated sensitivity to puff signals relative to omni-directional (one port) microphone designs, which cannot cancel noise. Sensitivity to puff noise results from turbulent audible noise caused by the puff signals at each of the two inlet ports on the housing, with the resulting turbulences uncorrelated at the two ports and random in phase.

In the prior art, several attempts have been made to reduce the effects of microphone puff noise. For example, in one typical solution, foam windscreens are placed around the microphone. However, use of such foam screens increase the distance between the microphone and the user's lips, reducing the effectiveness of noise canceling microphones.

Thus, improved designs for high noise-canceling microphone assemblies with low "puff" pickup are needed. In particular, there is a need for improved microphone assemblies are that enable noise cancellation, minimize the effects of puff noise, and provide good speech signal pickup.

SUMMARY OF THE INVENTION

The present invention provides a solution to the needs described above through an inventive system and method for reduced noise in a microphone.

The present invention provides a microphone apparatus. The microphone apparatus includes a housing with an outer surface and an interior chamber. A microphone element is disposed within the interior chamber. The outer surface includes a first substantially planar surface having at least one aperture leading to the interior chamber and a second substantially planar surface intersecting at an angle with the first planar surface.

The present invention provides a telephone handset. The telephone handset includes a lower housing capsule with an outer surface and a microphone chamber. A microphone element is disposed within the microphone interior chamber. The outer surface includes a first substantially planar surface having at least one aperture leading to the interior chamber and a second substantially planar surface intersecting at an angle with the first planar surface. The handset further includes an upper housing capsule with a speaker chamber joined with the lower housing member. A speaker is disposed within the speaker interior chamber.

The invention further provides a telephone handset mouthpiece cap. The telephone handset includes a first substantially planar surface having a first aperture and second aperture and a second substantially planar surface intersecting at an angle with the first planar surface. The first substantially planar surface is oriented to rise steeply to intersect with the second substantially planar surface, forming a ridge which shields the first aperture and second aperture disposed within the first planar surface from turbulence associated with a puff stream emitted from a telephone handset user.

The invention further provides a method for reducing puff noise in a noise canceling microphone assembly. The microphone includes a housing with an outer surface and an interior chamber containing a microphone element. The outer surface includes a first substantially planar surface having apertures leading to the interior chamber and a second substantially planar surface intersecting at an angle with the first planar surface. The method includes providing a first acoustic channel directed at the second substantially planar surface and substantially directing puff noise emitted by a microphone assembly user towards the second substantially planar surface. The method further includes providing a second acoustic channel to the apertures and propagating sound waves along the second acoustic channel and through the apertures to the microphone element.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive microphone.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The present invention discloses a noise-canceling microphone assembly with low puff noise pickup. The microphone assembly is designed to keep pickup ports close to the lips to enable good speech signal pickup and noise cancellation while simultaneously removing the ports from a user puff stream, thereby reducing puff noise.

Figure 1:
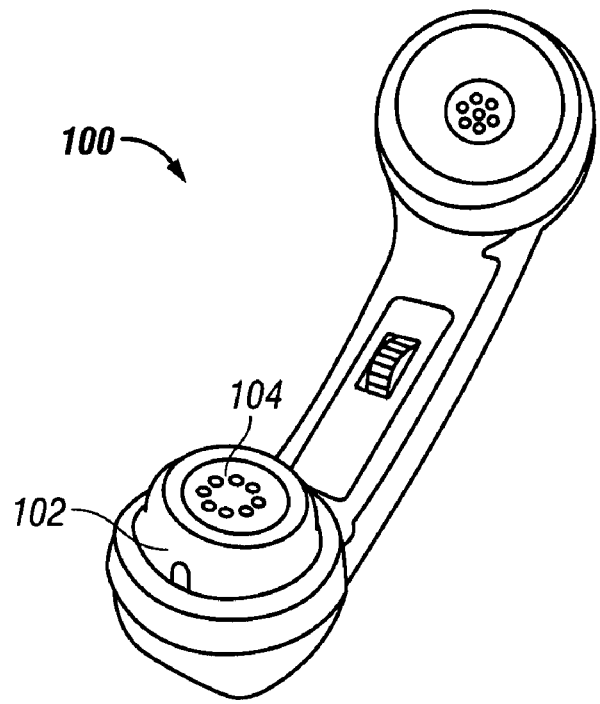
FIG. 1 illustrates a prior art telephone handset.
Figure 2:
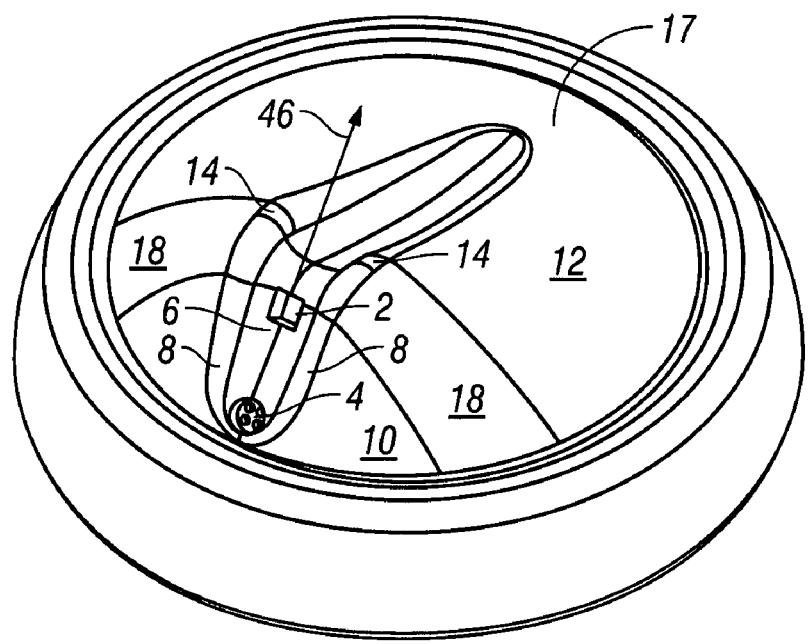
FIG. 2 illustrates a perspective view of an embodiment of the microphone assembly of the present invention.

Referring to FIG. 2, a perspective view of an embodiment of the microphone assembly of the present invention is shown. In an embodiment of the invention, the microphone assembly housing is a contoured mouthpiece cap 17 that is attached to a telephone handset vie a mouthpiece cap ring 16. The contoured mouthpiece cap 17 includes a first substantially planar surface 10 and a second substantially planar surface 12 which intersect. First substantially planar surface 10 includes a first sound port 2 and a second sound port 4 leading to an interior chamber. First sound port 2 and second sound port 4 are apertures through which sound waves can propagate to a microphone element disposed within the interior chamber.

First substantially planar surface 10 and second substantially planar surface 12 each have a lower surface 6. On each side of lower surface 6 is a sidewall 8 which rises to the upper surface of first substantially planar surface 10 and second substantially planar surface 12. First sound port 2 and second sound port 4 are disposed on the lower surface 6 of the first substantially planar surface 10. The lower surface 6 together with each sidewall 8 form an air channel through which sound waves may travel to first sound port 2 and second sound port 4.

In an embodiment of the invention, first substantially planar surface 10 is oriented to rise steeply to intersect with second substantially planar surface 12, forming a ridge 18 which shields first sound port 2 and second sound port 4 disposed within first substantially planar surface 10 from turbulence associated with a puff stream emitted from a microphone user. Other arrangements of first substantially planar surface 10 and second substantially planar surface 12 are possible which also allow first substantially planar surface 10 to be disposed outside the puff stream emitted from the microphone user.

Each sidewall 8 of first substantially planar surface 10 and second substantially planar surface 12 meet at ridge 18 to form occlusion prevention peaks 14. In operation, occlusion prevention peaks 14 prevent a microphone user's lips or cheeks from occluding first sound port 2 during use of the microphone, the closest port to ridge 18. In an embodiment of the invention, occlusion prevention peaks 14 rise above ridge 18 by at least one millimeter.

Thus, contoured mouthpiece cap 17 prevents occlusion of first sound port 2 by the user's lips or cheek, and is further designed to insure that sound from the lips is not cut off from arriving at first sound port 2 and second sound port 4. More specifically, in this embodiment, the contoured mouthpiece cap 17 contour contains dual rising sidewall 8 bordering on both sides of lower surface 6, and further wherein the walls rise into occlusion prevention peaks 14, which prevent the aforementioned lip occlusion of first sound port 2 or second sound port 4. In this same embodiment, the dual rising sidewall 8 above lower surface 6 form a channel crossing over ridge 18 through which sound from the lips may travel in an unobstructed manner to first sound port 2 and second sound port 4, thereby retaining the proper phase information in the speech important for quality noise-canceling.

Figure 3:
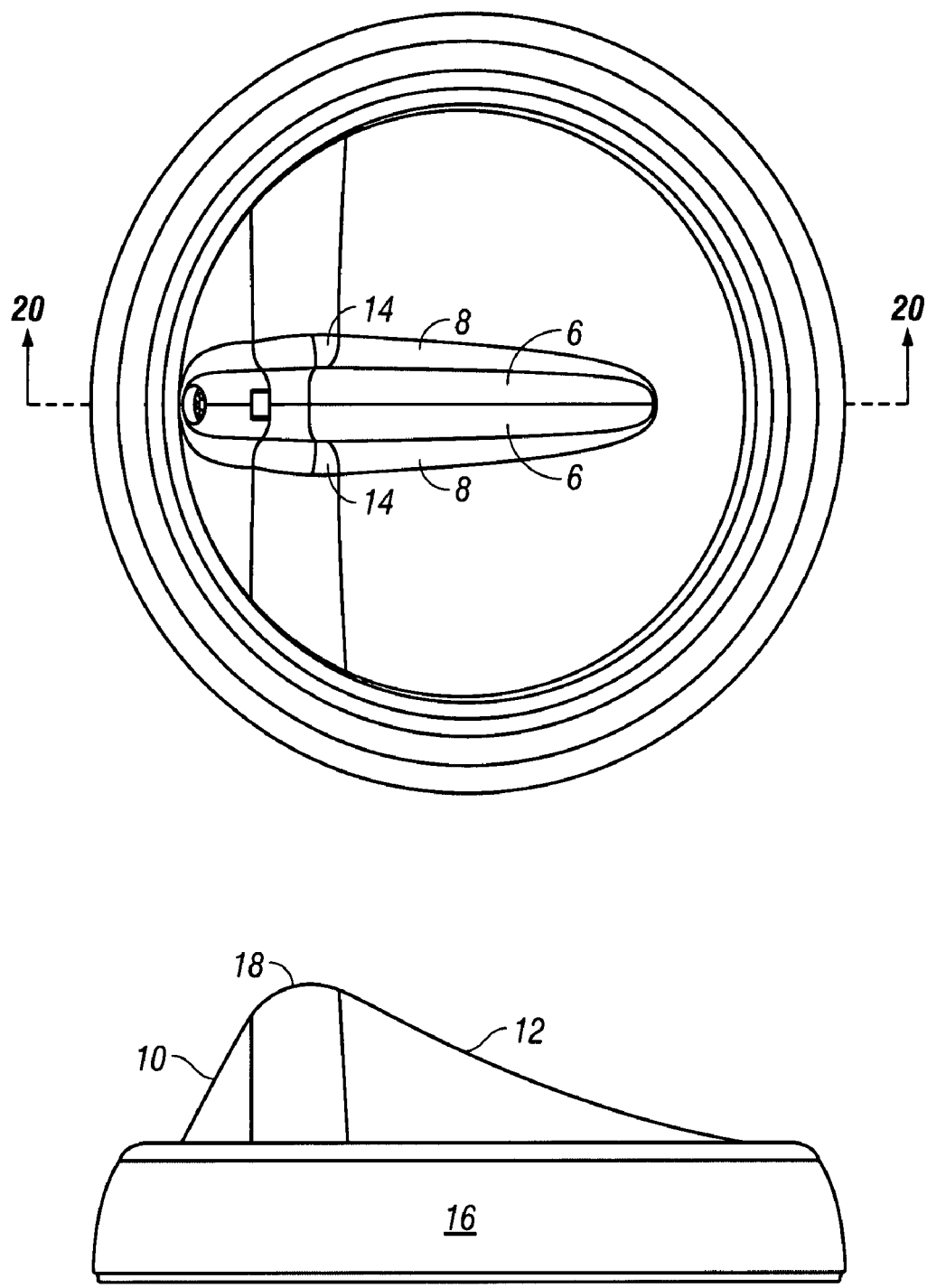
FIG. 3 illustrates a top view and side view of an embodiment of the microphone assembly of the present invention.

In operation, first sound port 2 and second sound port 4 define a port line 46 directed toward a microphone apparatus user's lips during use of the microphone. Referring to FIG. 3, a top view and side view illustration of the microphone assembly described herein in reference to FIG. 2 is shown. A cross-sectional view of the microphone assembly at line 20 is shown and described in reference to FIG. 4.

Figure 4:
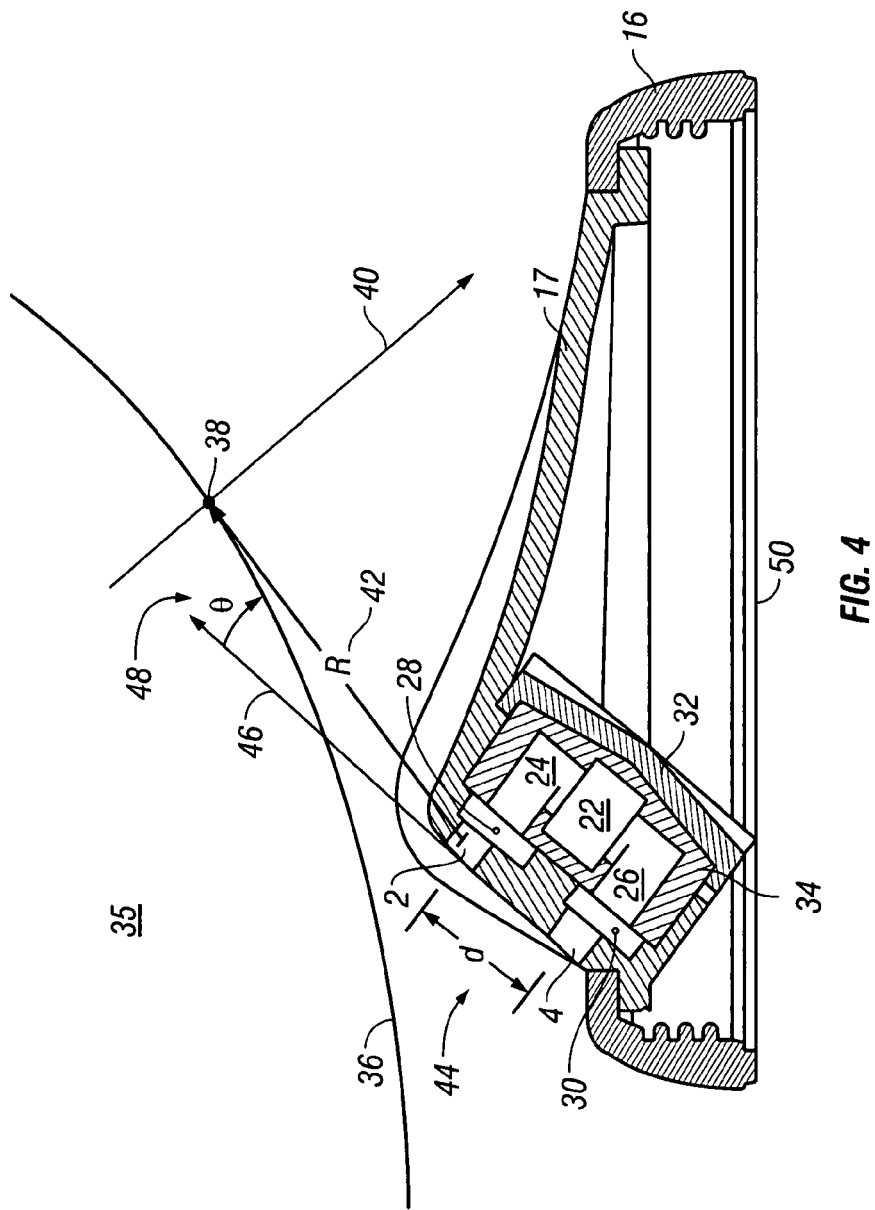
FIG. 4 illustrates a cross section view of an embodiment of the microphone assembly of the present invention.

Referring to FIG. 4, a cross-sectional view of an embodiment of the microphone assembly of the present invention is shown. Disposed beneath contoured mouthpiece cap 17 in the interior chamber is microphone sub-assembly 34. Microphone sub-assembly 34 includes a microphone element 22. In an embodiment of the invention, microphone element 22 is an electret type microphone element. An assembly clamp 32 holds microphone sub-assembly 34 securely in place against contoured mouthpiece cap 17. Beneath first sound port 2 is sound channel 24 leading to one side of microphone element 22. Beneath second sound port 4 is sound channel 26 leading to the other side of microphone element 22. In an embodiment of the invention, an acoustic cavity 28 is located beneath first sound port 2 and an acoustic cavity 30 is located beneath second sound port 4. Acoustic cavity 28 and acoustic cavity 30 are an optional feature which may be used to tune the Helmholtz resonance frequency associated with first sound port 2 and second sound port 4 or used to accommodate acoustically resistive material. A distance d 44 separates first sound port 2 and second sound port 4.

Referring to FIG. 4, the microphone sub-assembly 34 is shown positioned adjacent first sound port 2 and second sound port 4 and acoustic cavity 28 and acoustic cavity 30. In an embodiment of the invention, microphone sub-assembly 34 utilizes a rubber boot structure and a bi-directional electret microphone element. In alternative embodiments, a unidirectional element may be used. Assembly clamp 32 positions and seals with force microphone sub-assembly 34 against the interior of contoured mouthpiece cap 17 using an elastomeric exterior.

In an embodiment of the invention, microphone sub-assembly 34 utilizes a rubber boot structure such as that described in U.S. Pat. No. 5,226,076, "Directional Microphone Assembly", which is hereby incorporated by reference. Microphone sub-assembly 34 utilizes a rectangular block structure molded from vulcanized rubber or other suitable resilient material. The rectangular block structure includes openings which transmit sound pressure via sound channel 24 and sound channel 26 to microphone element 22. Microphone element 22 includes two wires which exit microphone sub-assembly 34 through a self-sealing hole. The rectangular block structure is appropriately sized to form a seal with microphone element 22 so that sound pressure is not leaked between sound channel 24 and sound channel 26. Use of a resilient material by microphone sub-assembly 34 eliminates the need for adhesives to achieve the desired sealing.

Figure 5:
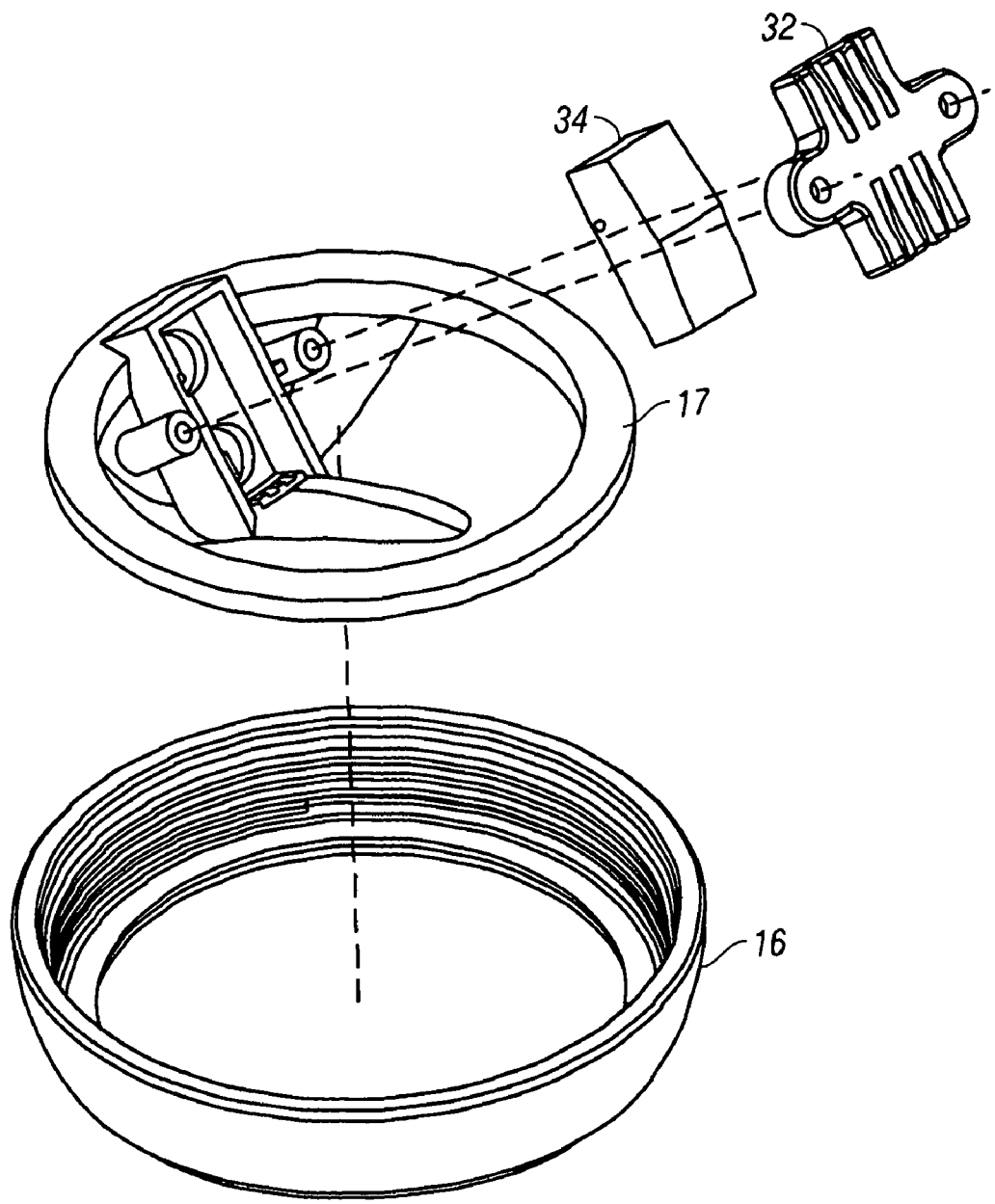
FIG. 5 illustrates a perspective view of a microphone sub-assembly in a disassembled state.
Figure 6:
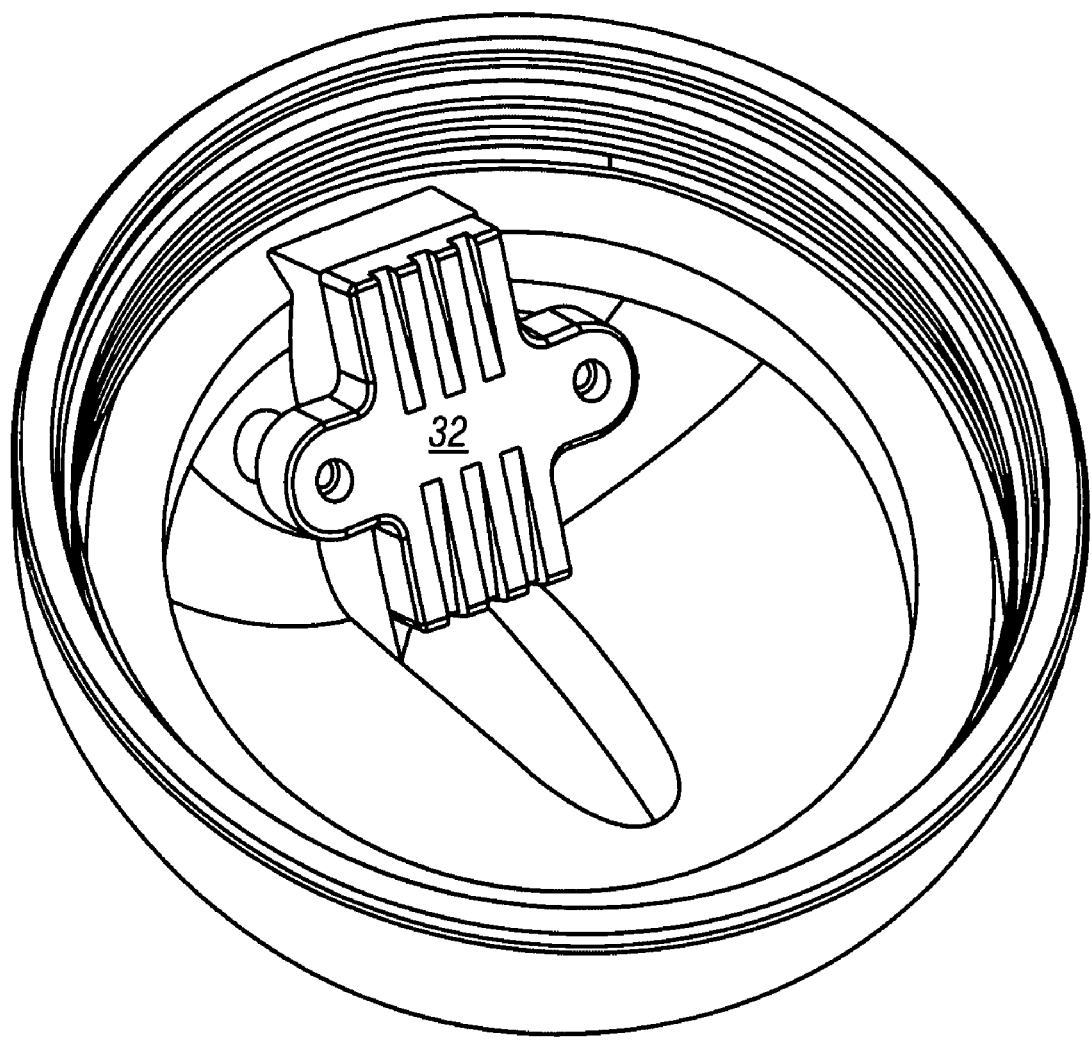
FIG. 6 illustrates a perspective view of the microphone sub-assembly in an assembled state.

FIG. 5 illustrates a perspective view of a microphone assembly in a disassembled state and illustrates an interior side of contoured mouthpiece cap 17. Assembly clamp 32 secures microphone sub-assembly 34 to contoured mouthpiece cap 17. Contoured mouthpiece cap 17 is inserted into mouthpiece cap ring 16 so that the microphone assembly can be connected to a telephone handset. Referring to FIG. 6, a perspective view of the microphone sub-assembly in an assembled state is illustrated.

The operation of an embodiment of the microphone assembly of the present invention will now be described in reference to FIG. 4. The use of the noise canceling handset microphone assembly 50 by a user 35 is shown. In an embodiment of the invention, the noise canceling handset microphone assembly 50 is used with a traditional telephone handset mouthpiece, such as a G-style handset. In operation, traditional-styled handset mouthpieces are placed nearby the lip center of the user. A typical distance is 12 to 36 mm from the lip center. The handset generally presents a relatively large acoustically diffraction obstacle affecting the talker's speech waves, typically 40-70 mm across the user's face.

FIG. 4 shows the inventive noise-canceling handset microphone assembly 50 adjacent an approximate overhead view of the lips and surrounding cheek profile 35 for reference. Noise-canceling handset microphone assembly 50 contains contoured mouthpiece cap 17 containing microphone sub-assembly 34 below. Assembly clamp 32 positions and seals microphone sub-assembly 34 against the interior of contoured mouthpiece cap 17. Contoured mouthpiece cap 17 is captured by mouthpiece cap ring 16 so as to attach the microphone assembly 50 to the handset's handle and earpiece. The earpiece is an upper housing capsule with a speaker chamber that has a speaker located inside.

A top view of a cheek and lip profile 36 is shown relative to the microphone assembly during use. A lip center 38 indicates the location at which a puff stream center 40 emanates in an outward direction from cheek and lip profile 36. A user's puff stream is centered on puff stream center 40 and approximately includes a cone centered about puff stream center 40 having included angle of 30 to 90 degrees, varying from user to user. For illustrative purposes, relationships between the microphone assembly and user are shown. Such relationships are not intended to limit the scope of the inventive microphone assembly. A distance R 42 separates first sound port 2 and lip center 38. An angle θ 48 is defined by port line 46 and distance R 42. Port line 46 is defined by the center of entrances of first sound port 2 and second sound port 4.

In operation, puff stream center 40 emanated by a user during talking is substantially directed away from first sound port 2 and second sound port 4 disposed on first substantially planar surface 10. Furthermore, effects on first sound port 2 and second sound port 4 of additional components of the puff stream emitted by the user are blocked by ridge 18. Simultaneously, distance R 42 is kept to a minimum. Minimization of distance R 42 allows noise cancellation functionality of first sound port 2 and second sound port 4 to be maximized.

First substantially planar surface 10 is oriented so that the port line 46 defined by the center of the entrances to the two ports is directed substantially toward the lip center 38 as defined by the relatively small angle θ 48. In an embodiment of the invention, θ 48 is between 12 and 15 degrees. This arrangement, coupled with first substantially planar surface 10 oriented so that first sound port 2 and second sound port 4 are kept as close to lip center 38 as possible allows for maximum noise-canceling. In an embodiment, the distance R 42 is approximately between 23 and 27 mm.

In an embodiment of the invention, to accommodate first substantially planar surface 10 and its aforementioned orientation with port line 46 directed substantially toward lip center 38, and with first sound port 2 and second sound port 4 out of a user's puff stream and in close proximity to lip center 38, a contoured mouthpiece cap 17 is utilized. To maintain the proper orientation of first substantially planar surface 10, contoured mouthpiece cap 17 is designed such that first substantially planar surface 10 is a steeply rising surface that rises into ridge 18. On the other side of ridge 18, the surface of contoured mouthpiece cap 17 continues with second substantially planar surface 12, gradually declining in some arbitrary fashion on a lip center 38 and puff stream center 40 side of contoured mouthpiece cap 17.

Thus, contoured mouthpiece cap 17 contains first substantially planar surface 10 and second substantially planar surface 12 which intersect at an angle so that puff stream center 40 is directed towards second substantially planar surface 12 but not first substantially planar surface 10. In further embodiment of the invention, the angle of intersection of first substantially planar surface 10 and second substantially planar surface 12 may be varied as well as the shape and decline of second substantially planar surface 12.

The present invention therefore provides for a microphone assembly with low puff pickup. The inventive microphone assembly allows the sound ports to be kept as close to the lips as possible and outside a talker puff stream. The microphone also provides additional shielding of the ports against puff noise and protects against lip or cheek occlusion of the ports. The microphone assembly further forms a physical channel through which sound from the user's lips may travel in an unobstructed manner to the ports.

One of ordinary skill in the art will recognize that other architectures for the inventive microphone assembly may be employed. Although reference is made throughout the specification to a handset, the present invention could be employed in any device having a microphone assembly where reduced puff noise is desirable. Although reference is made throughout the specification to reducing puff noise, the inventive microphone assembly may be used to reduce the effects of other types of noise, such as wind noise, and may be used with non-noise canceling microphones. Furthermore, although in the preferred embodiment the contoured surface is located at the mouthpiece cap, in other embodiments the contoured surface may be located beneath a traditional handset mouthpiece cap or other location.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A telephone handset mouthpiece comprising:
a first substantially planar surface having a first aperture and second aperture;
a second substantially planar surface intersecting at an angle with the first planar surface, wherein the first substantially planar surface is oriented to rise steeply to intersect with the second substantially planar surface, forming a ridge which shields the first aperture and second aperture disposed within the first planar surface from turbulence associated with a puff stream emitted from a telephone handset user; and
a ring encircling the first substantially planar surface and the second substantially planar surface.

2. The telephone handset mouthpiece of claim 1, wherein the first substantially planar surface is disposed outside the puff stream emitted from the telephone handset user.

3. The telephone handset mouthpiece of claim 1, wherein the first substantially planar surface and second substantially planar surface include a lowered surface, wherein dual sidewalls rise from the lowered surface to an upper surface, and wherein the aperture is disposed on the lowered surface of the first substantially planar surface.

4. The telephone handset mouthpiece of claim 3, wherein the lowered surface and rising sidewalls form an air channel through which speech sound may travel to the aperture.

5. The telephone handset mouthpiece cap of claim 3, wherein the dual sidewalls of the first substantially planar surface and the second substantially planar surface meet at the ridge to form protruding peaks.

6. The telephone handset mouthpiece of claim 5, wherein the protruding peaks rise above the ridge by at least one millimeter.

7. The telephone handset mouthpiece of claim 5, wherein the protruding peaks prevent occlusion of the aperture by a user lip or cheek during operation of the microphone apparatus.

8. A telephone handset mouthpiece comprising:
a first surface having an aperture;
a second surface intersecting at an angle with the first surface, wherein the first surface is oriented to rise steeply to intersect with the second surface, wherein an intersection between the first surface and the second surface form a ridge; and
a ring encircling the first surface and the second surface.

9. The telephone handset mouthpiece of claim 8, wherein the first surface is disposed outside the puff stream emitted from the telephone handset user.

10. The telephone handset mouthpiece of claim 8, wherein the first surface and second surface include a lowered surface, wherein dual sidewalls rise from the lowered surface to an upper surface, and wherein the aperture is disposed on the lowered surface of the first surface.

11. The telephone handset mouthpiece of claim 10, wherein the lowered surface and rising sidewalls form an air channel through which speech sound may travel to the aperture.

12. The telephone handset mouthpiece cap of claim 10, wherein the dual sidewalls of the first surface and the second surface meet at the ridge to form protruding peaks.

13. The telephone handset mouthpiece of claim 12, wherein the protruding peaks rise above the ridge by at least one millimeter.

14. The telephone handset mouthpiece of claim 12, wherein the protruding peaks prevent occlusion of the aperture by a user lip or cheek during operation of the microphone apparatus.

15. The telephone handset mouthpiece of claim 12, wherein the first surface comprises a first aperture and a second aperture, wherein the first aperture and second aperture define a port line directed toward a telephone handset user's lips.

* * * * *